Nov. 25, 1969     W. A. MUSIC     3,479,879

MANOMETER

Filed March 29, 1968

INVENTOR
WILLIAM A. MUSIC

BY HIS ATTORNEYS
HARRIS, KIECH, RUSSELL & KERN

United States Patent Office 3,479,879
Patented Nov. 25, 1969

3,479,879
MANOMETER
William A. Music, Pomona, Calif., assignor to Schwien Engineering, Inc., Pomona, Calif., a corporation of California
Filed Mar. 29, 1968, Ser. No. 717,165
Int. Cl. G01l 9/00; H01g 7/00
U.S. Cl. 73—398                        9 Claims

ABSTRACT OF THE DISCLOSURE

A manometer for measurement of differential pressure with high sensitivity and operable over a wide pressure range is disclosed. The manometer includes a unitary metal diaphragm for operation at high and low obsolute pressures and capable of withstanding large overpressures. A dual capacitor with one moving plate connected to the diaphragm and two fixed plates is disposed in one chamber of the manometer for operation unaffected by change in dielectric constant due to pressure change.

---

Figure 1:
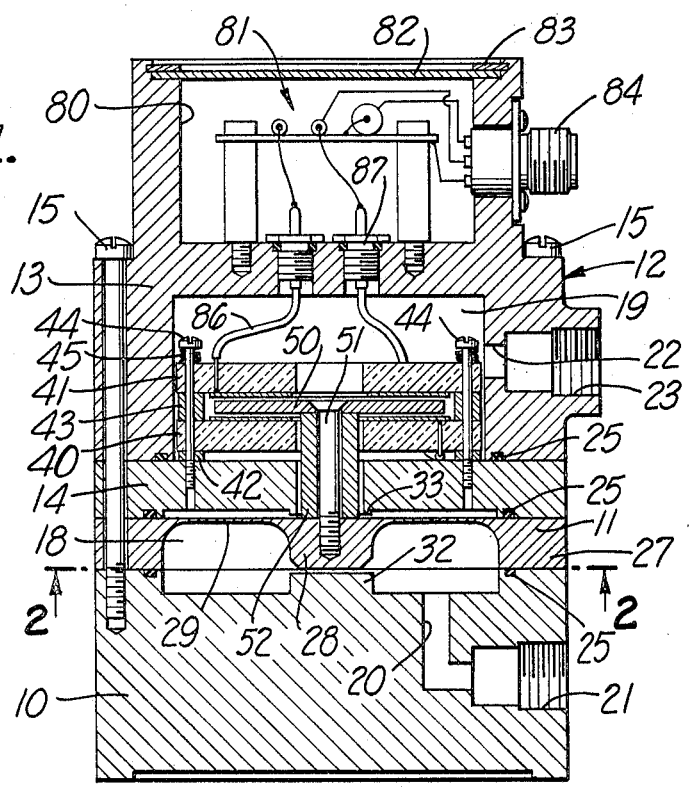

This invention relates to manometers for providing an electrical output varying as a function of pressure, and in particular, to a new and improved capacitance-type differential pressure transducer.

A typical transducer includes a diaphragm mounted in a housing with the two faces of the diaphragm exposed to two pressure sources. The mechanical movement of the diaphragm resulting from the difference in pressure is coupled to an electrical element, such as a plate of a capacitor, to provide an electrical output varying as a function of diaphragm movement and therefore of pressure difference.

It is an object of the present invention to provide a new and improved manometer which is operable over a wide range of absolute pressures, while having high sensitivity and linearity at any operating pressure. One embodiment of the manometer is operable throughout the range of zero to 100 inches of mercury pressure while providing a null or zero pressure differential indication with an accuracy of ±.005 inch of mercury at any point in the operating range.

It is a further object to provide such a manometer which can have the high pressure applied to either face of the diaphragm and which can be operated with high overpressures without affecting the accuracy or the operation. The manometer of the invention will withstand overpressures several hundred times the working pressure.

In the capacitance-type differential pressure transducer, the moving plate of the capacitor may be positioned within the housing in one of the pressure chambers such that the fluid providing the pressure comprises the dielectric of the capacitor. The dielectric constant of most fluids changes by a factor of .01% per atmosphere change in pressure. Such change will adversely affect the calibration in high sensitivity instruments and it is a further object of the invention to provide a new and improved capacitor construction which substantially eliminates this factor.

The invention also comprises novel details of construction and novel combinations and arrangements of parts, which will more fully appear in the course of the following description. The drawing merely shows and the description merely describes a preferred embodiment of the present invention which is given by way of illustration and example.

Figure 2:
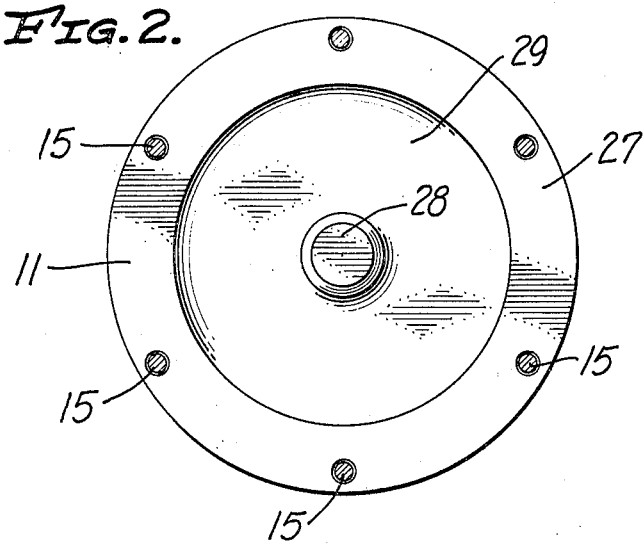
Figure 3:
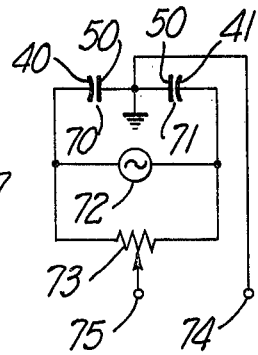

In the drawing:
FIGURE 1 is a vertical sectional view of a manometer incorporating a preferred embodiment of the invention;

FIGURE 2 is a sectional view taken along the line 2—2 of FIGURE 1; and
FIGURE 3 is an electrical diagram illustrating the operation of the manometer of FIGURE 1.

The manometer of the drawing includes a housing having a lower member 10, a diaphragm 11, and an upper member 12. The upper member may be formed in two parts including a cover or cap 13 and a limiter plate 14, with the housing clamped together by through bolts 15. These various components typically are made of metal and preferably of a stainless steel, permitting the use of the manometer with a wide variety of fluids.

Appropriate cavities are provided in the housing members to define a lower pressure chamber 18 and an upper pressure chamber 19. A passage 20 and a tapped opening 21 provide for connection of a pressure source to the chamber 18. A similar passage 22 and a tapped opening 23 provide for connection of a pressure source to the chamber 19. O-rings 25 provide pressure seals between the components which are clamped together to form the chambers.

The diaphragm 11 is formed of a unitary piece of metal and has a relatively thick, substantially rigid outer rim 27 and a relatively thick center portion 28 joined by a relatively thin annular portion 29. A boss 32 on the lower member 10 has an upper surface positioned adjacent the center portion 28 of the diaphragm. An annular boss 33 on the limiter plate 14 has its lower surface positioned adjacent the center portion 28 of the diaphragm. When the diaphragm is unstressed, it is approximately equally spaced between the two bosses, with the bosses serving as stops to limit motion of the diaphragm in each direction. Diaphragm motion is preferably limited to a few thousandths of an inch and in the embodiment illustrated, the total excursion of the center portion 28 is about three thousandths of an inch. The rim 27 and the center portion 28 of the diaphragm preferably are in the order of about one-quarter to one-half inch thick and typically three-eighths of an inch thick, thereby providing a quite rigid periphery and center core. The annular portion 29 is made in the order of about 10 to 30 thousandths of an inch thick and typically 22 thousandths of an inch, providing a deflection of about three thousandths of an inch for a differential pressure of 5 p.s.i. The sensitivity of the instrument may be varied by varying the thickness of the annular portion 29 and by varying the particular material utilized.

With the diaphragm construction illustrated and described, a highly linear response is obtained. This linear response is obtained over a wide operating range and the particular embodiment illustrated is operable from zero to 100 inches of mercury pressure, with either chamber suitable for having the higher pressure. Also, the diaphragm construction will withstand overpressures in either chamber hundreds of times greater than the operating pressure. This results in a rugged, reliable, accurate and highly sensitive manometer. The manometer will provide an accuracy of ±.005 inch mercury pressure throughout the operating range.

The diaphragm is utilized to drive the moving plate of a capacitor and a preferred capacitor construction is illustrated in the drawing. A glass disc 40 with a metallic film ring on the upper face thereof and another glass disc 41 with a metallic film ring on the lower face thereof, serve as the fixed plates of the capacitor. The discs 40, 41 are mounted on the limit plate 14 with spacers 42, 43, bolts 44 and springs 45.

An aluminum disc 50 is fastened to the center portion 28 of the diaphragm by a screw 51 with a spacer post 52 between the diaphragm 11 and disc 50. The screw 51 and post 52 pass through aligned openings in the disc 40 and the limit plate 14. The disc 50 is made of a conducting metal, typically aluminum, and functions as the moving plate of the capacitor.

The electrical circuit for a typical capacitive-type transducer is provided in FIGURE 3. Capacitors 70, 71 are connected in series across an AC signal source 72. A resistance 73 is also connected across the signal source, with the output appearing at terminal 74 connected to the junction of the two capacitors and terminal 75 connected to a point on the resistance 73. The resistance 73 typically is a potentiometer with a moving arm as the output, providing for null adjustment of the circuit. In the conventional transducer, one of the capacitors is the transducer capacitor, with a moving plate, and the other capacitor is a reference capacitor.

In the transducer of the present invention, both capacitor are positioned within one chamber of the housing and the moving plate 50 will function as the common plates of the capacitors 70, 71 and the fixed plates 40, 41 will function as the other plates of the capacitors 70, 71, respectively. With this arrangement, the capacitance between moving plate 50 and fixed plate 41 will change in one direction and the capacitance between the moving plate 50 and the fixed plate 40 will change in the other direction a similar amount for a given excursion of the center portion of the diaphragm. The need for a separate reference capacitor is eliminated, the output of the system is increased, and the calibration of the system over various operating pressures is improved. The latter advantage is achieved because the dielectric constant of fluids change with the pressure of the fluid and of course, the capacitance of a capacitor is a function of the dielecrtic constant of the dielectric between the capacitor plates. There is no corresponding change in the dielectric constant of a reference capacitor but with both capacitances within the chamber, the dielectric constant is the same for both capacitances.

The transducer is primarily used as a null or zero differential pressure indicating device. The circuit may be connected as illustrated in FIGURE 3 and with equal pressures in the two chambers, the arm of the resistance 73 is adjusted to provide a zero or null signal at the terminals 74, 75. Then a differential pressure in the two chambers will produce a voltage across the terminals 74, 75 with the magnitude of the voltage being indicative of the magnitude of the differential pressure and with the phase of the voltage being indicative of which chamber has the higher pressure.

An additional chamber 80 may be provided in the upper end of the upper member 12 for receiving the electrical circuitry, indicated generally at 81. The chamber 80 is closed by a lid 82 and a snap ring 83, and a connector 84 provides for coupling an external cable and associated circuitry to the transducer. The fixed capacitor plates are connected to the circuitry 81 or to the connector 84 by appropriate wires 86 and feed through bushings 87 located in the wall of the upper member 12 between the chamber 19 and the chamber 80. The moving plate 50 of the capacitor is electrically connected to the housing which serves as circuit ground.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:

1. In a differential pressure manometer, the combination of:
   a housing;
   a diaphragm mounted in said housing defining first and second pressure chambers on opposite sides of the diaphragm,
   said housing including means for connecting a first line to said first chamber and a second line to said second chamber;
   a capacitor mounted in said housing and including a fixed plate and moving plate; and
   circuit means for connecting said capacitor plate to an external circuit;
   said diaphragm comprising a unitary metal plate having a relatively thick, substantially rigid rim and a relatively thick center portion joined by a relatively thin and flexible annular portion for movement of said center portion relative to said rim normal to the plane of said annular portion, with said rim mounted in said housing and said moving plate connected to said center portion; and said housing including a rigid stop member positioned on each side of said diaphragm center portion limiting diaphgram movement to a few thousands of an inch.

2. A manometer as defined in claim 1 in which said housing includes an upper member and a lower member with said diaphragm rim clamped between said housing members.

3. A manometer as defined in claim 1 in which said annular portion of said diaphragm is in the order of about 10 to 30 thousands of an inch thick and said rim is in the order of about one-quarter to one-half inch thick.

4. A manometer as defined in claim 1 in which said capacitor includes first and second fixed plates mounted in said housing in spaced relation with said moving plate positioned therebetween, providing an increase in capacitance between a moving plate and one fixed plate and a decrease in capacitance between a moving plate and the other fixed plate when said diaphragm center portion is moved.

5. In a differential pressure manometer, the combination of:
   a housing;
   a diaphragm mounted in said housing defining first and second pressure chambers on opposite sides of said diaphragm,
   said housing including means for connecting a first line to said first chamber and a second line to said second chamber;
   a capacitor mounted in said housing and including first and second fixed plates mounted in said housing in spaced relation with a moving plate positioned therebetween;
   circuit means for connecting said capacitor plates to an external circuit; and
   means for connecting said moving plate to said diaphragm, providing an increase in capacitance between the moving plate and one fixed plate and a decrease in capacitance between the moving plate and the other fixed plate with a pressure differential in said chambers and said housing including a rigid stop member positioned on each side of said diaphragm limiting diaphragm movement to a few thousandths of an inch.

6. A manometer as defined in claim 5 in which said capacitor plates are mounted parallel to each other and to said diaphragm.

7. A manometer as defined in claim 5 in which all of said capacitor plates are mounted in one of said chambers of the housing.

8. In a differential pressure manometer, the combination of:
   a housing including a lower member and an upper member;
   a diaphragm comprising a unitary metal plate having a relatively thick, substantially rigid rim and a relatively thick center portion joined by a relatively thin and flexible annular portion;
   means for joining said housing members with said diaphragm therebetween, said diaphragm and lower member defining a first chamber and said diaphragm and upper member defining a second chamber,
   said lower member including a first stop for engaging said diaphragm center portion for limiting diaphragm movement toward said lower member and said upper member including a second stop for engaging said diaphragm center portion for limiting diaphragm movement toward said upper member, said housing including means for connecting a first line to said first chamber and a second line to said second chamber;

a capacitor including first and second fixed plates mounted in spaced relation in one of said chambers in said housing, and a moving plate positioned between said fixed plates;

means for mounting said moving plate to said diaphragm center portion; and circuit means for connecting said capacitor plates to an external circuit, with movement of said diaphragm center portion and said moving plate providing an increase in capacitance between the moving plate and one fixed plate and a decrease in capacitance between the moving plate and the other fixed plate.

9. A manometer as defined in claim 8 in which one of said housing members includes a first limit element carrying the stop and the fixed capacitor plates and disposed adjacent the diaphragm, and a second cover element enclosing the capacitor and disposed spaced from the diaphragm.

References Cited

UNITED STATES PATENTS 2,164,638   7/1939   Broeze et al.
2,368,278   1/1945   Warshaw _____ 73—398

DONALD O. WOODIEL, Primary Examiner

U.S. Cl. X.R.

317—246